(12) United States Patent
Hu et al.

(10) Patent No.: US 10,390,015 B2
(45) Date of Patent: Aug. 20, 2019

(54) UNIFICATION OF PARAMETERS DERIVATION PROCEDURES FOR LOCAL ILLUMINATION COMPENSATION AND CROSS-COMPONENT LINEAR MODEL PREDICTION

(71) Applicant: QUALCOMM Incorporated, San Diego, CA (US)

(72) Inventors: Nan Hu, Kanata (CA); Jianle Chen, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 15/685,738

(22) Filed: Aug. 24, 2017

(65) Prior Publication Data

US 2018/0063531 A1   Mar. 1, 2018

Related U.S. Application Data

(60) Provisional application No. 62/380,223, filed on Aug. 26, 2016.

(51) Int. Cl.
| | |
|---|---|
| *H04N 19/124* | (2014.01) |
| *H04N 19/132* | (2014.01) |
| *H04N 19/176* | (2014.01) |
| *H04N 19/48* | (2014.01) |
| *H04N 19/587* | (2014.01) |

(Continued)

(52) U.S. Cl.
CPC ......... *H04N 19/124* (2014.11); *H04N 19/132* (2014.11); *H04N 19/176* (2014.11); *H04N 19/186* (2014.11); *H04N 19/42* (2014.11); *H04N 19/48* (2014.11);

(Continued)

(58) Field of Classification Search
USPC .................................................... 375/240.03
See application file for complete search history.

(56) References Cited

U.S. PATENT DOCUMENTS

| | | | |
|---|---|---|---|
| 2009/0086816 A1* | 4/2009 | Leontaris | H04N 19/80 |
| | | | 375/240.03 |
| 2012/0328013 A1 | 12/2012 | Budagavi et al. | |

(Continued)

OTHER PUBLICATIONS

Chen J., et al., "Algorithm description of Joint Exploration Test Model 3 (JEM3)," 3. JVET Meeting; May 26, 2016-Jun. 1, 2016; Geneva; (The Joint Video Exploration Team of ISO/IEC JTC1/SC29/WG11 and ITU-T SG.16); URL: http://phenix.int-evry.fr/jvet/, No. JVET-C1001_v1, Jul. 2, 2016 (Jul. 2, 2016), XP030150223, 38 Pages.

(Continued)

*Primary Examiner* — Behrooz M Senfi

(74) *Attorney, Agent, or Firm* — Shumaker & Sieffert, P.A.

(57) ABSTRACT

A device for coding video data can be configured to perform a parameter derivation operation to determine one or more first parameters for a first block of video data; performing the parameter derivation operation to determine one or more second parameters for a second block of video data that is coded in a different coding mode than the first block of video data; code the first block of video data based on the one or more first parameters; and code the second block of video data based on the one or more second parameters.

30 Claims, 7 Drawing Sheets

(51) Int. Cl.
  *H04N 19/61* (2014.01)
  *H04N 19/186* (2014.01)
  *H04N 19/42* (2014.01)
  *H04N 19/577* (2014.01)

(52) U.S. Cl.
  CPC ......... *H04N 19/577* (2014.11); *H04N 19/587* (2014.11); *H04N 19/61* (2014.11)

(56) References Cited

U.S. PATENT DOCUMENTS

| | | | | |
|---|---|---|---|---|
| 2013/0279577 | A1* | 10/2013 | Schwarz | H04N 19/50 375/240.12 |
| 2018/0027262 | A1* | 1/2018 | Reinhard | H04N 19/70 382/166 |
| 2018/0084255 | A1* | 3/2018 | Tourapis | H04N 19/573 |

OTHER PUBLICATIONS

International Search Report and Written Opinion—PCT/US2017/048676—ISA/EPO—dated Jan. 17, 2018.
ITU-T H.265, Series H: Audiovisual and Multimedia Systems, Infrastructure of audiovisual services—Coding of moving Video, Advanced video coding for generic audiovisual services, The International Telecommunication Union. Dec. 2015, 664 pp.
Liu H., et al., "3D-CE1.h related: Illumination Compensation for Inter-View Prediction," 1. JCT-3V Meeting; 101. MPEG Meeting; Jul. 16, 2012-Jul. 20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/, No. JCT3V-A0086, pp. 1-7, Jul. 11, 2012 (Jul. 11, 2012), XP030130085.
Liu H., et al., "3D-CE2.h: Results of Illumination Compensation for Inter-View Prediction," 2nd JCT-3V Meeting; 102th MPEG Meeting; Oct. 13, 2012-Oct. 19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2/, No. JCT3V-B0045, pp. 1-5, Oct. 9, 2012 (Oct. 9, 2012), XP030130226.
Zhang X., et al., "3D-CE2: Complexity Reduction on Illumination Compensation for 3D-HEVC," 11th JCT-3V Meeting; Feb. 12, 2015-Feb. 18, 2015; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-K0032, Feb. 5, 2015, XP030132695, 7 pages.
Response to Written Opinion dated Jan. 17, 2018, from International Application No. PCT/US2017/048676, filed on Jun. 25, 2018, 5 pp.
Second Written Opinion from International Application No. PCT/US2017/048676, dated Aug. 28, 2018, 8 pp.
Chen J., et al., "Coding tools investigation for next generation video coding," SG-16-C806, Jan. 2015, 7 pp.
Chen J., et al., "Algorithm Description of Joint Exploration Test Model 3," Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages.
Hu N., et al., "Unification of Parameter Derivation for CCLM and LIC," JVET-D0122_v2, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6.
Karczewicz M., et al., "Study of Coding Efficiency Improvements beyond HEVC," 113. MPEG Meeting; Oct. 19, 2015-Oct. 23, 2015; Geneva; (Motion Picture Expert Group or ISO/IEC JTC1/SC29/WG11), No. M37102, Oct. 15, 2015 (Oct. 15, 2015), XP030065470, whole document, 13 pages.
Liu H., et al., "Local Illumination Compensation," 52, VCEG Meeting, Jun. 19, 2015-Jun. 26, 2015, Warsaw, (Video Coding Experts Group of ITU-T SG.16), No. VCEG-AZ06, Jun. 18, 2015 (Jun. 18, 2015), 11 Pages, XP030003883.
Suehring K., et al., "JVET common test conditions and software reference configurations," Joint Video Exploration Team (JVET) of ITU-T SG16 WP3 and ISO/IEC JTC1/SC29/WG11, 2nd Meeting: San Diego, USA, Feb. 20-26, 2016, Document: JVET-B1010, 4 pages.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
International Preliminary Report on Patentability from International Application No. PCT/US2017/048676, dated Dec. 12, 2018, 20 pp.

* cited by examiner

FIG. 4

UNIFICATION OF PARAMETERS DERIVATION PROCEDURES FOR LOCAL ILLUMINATION COMPENSATION AND CROSS-COMPONENT LINEAR MODEL PREDICTION

This application claims the benefit of U.S. Provisional Patent Application 62/380,223 filed 26 Aug. 2016, the entire content of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC), standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to local illumination compensation (LIC), overlapped block motion compensation (OBMC), weighted prediction applied for inter prediction, and cross-component linear model prediction mode (also referred to CCLM mode or just CCLM) for intra prediction. Among other techniques, this disclosure describes techniques for unifying the parameter derivations procedures used for LIC and CCLM in a manner that potentially simplifies the hardware and software implementations of video encoders and decoders, but without a significant reduction to overall coding quality. As an example, a video coder may perform a parameter derivation operation to determine one or more first parameters for a first block of video data coded using a first most and perform the same parameter derivation operation to determine one or more second parameters for a second block of the video data coded in a different mode. The video coder may then code (e.g., encode or decode) the first block of video data using the one or more first parameters and code the second block of video data using the one or more second parameters.

In one example, a method of coding video data includes, for a first block of video data, performing a parameter derivation operation to determine one or more first parameters for the first block of video data; for a second block of video data, performing the parameter derivation operation to determine one or more second parameters for the second block of video data, wherein the second block of video data is coded in a different coding mode than the first block of video data; coding the first block of video data based on the one or more first parameters; and coding the second block of video data based on the one or more second parameters.

In another example, a device for coding video data includes a memory for storing video data and a video coder comprising one or more processors configured to for a first block of video data, perform a parameter derivation operation to determine one or more first parameters for the first block of video data; for a second block of video data, perform the parameter derivation operation to determine one or more second parameters for the second block of video data, wherein the second block of video data is coded in a different coding mode than the first block of video data; code the first block of video data based on the one or more first parameters; and code the second block of video data based on the one or more second parameters.

In another example, an apparatus for coding video data includes means for performing a parameter derivation operation to determine one or more first parameters for a first block of video data; means for performing the parameter derivation operation to determine one or more second parameters for a second block of video data, wherein the second block of video data is coded in a different coding mode than the first block of video data; means for coding the first block of video data based on the one or more first parameters; and means for coding the second block of video data based on the one or more second parameters.

A computer-readable storage medium storing instructions that when executed cause one or more processors to: for a first block of video data, perform a parameter derivation operation to determine one or more first parameters for the first block of video data; for a second block of video data, perform the parameter derivation operation to determine one or more second parameters for the second block of video data, wherein the second block of video data is coded in a different coding mode than the first block of video data; code the first block of video data based on the one or more first parameters; and code the second block of video data based on the one or more second parameters.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 4 shows an example of a current block and two neighboring blocks for use in an OBMC operation.

DETAILED DESCRIPTION

This disclosure describes techniques related to local illumination compensation (LIC), overlapped block motion compensation (OBMC), weighted prediction applied for inter prediction, and cross-component linear model prediction mode (also referred to CCLM mode or just CCLM) for intra prediction. The techniques may be used in the context of advanced video codecs, such as the next generation of video coding standards, including but not limited to the H.266 standard presently under development. Among other techniques, this disclosure describes techniques for unifying the parameter derivations procedures used for LIC and CCLM in a manner that potentially simplifies the hardware and software implementations of video encoders and decoders, but without a significant reduction to overall coding quality.

According to the techniques of this disclosure, a video coder may perform a parameter derivation operation to determine one or more first parameters for a first block of video data coded using a first most and perform the same parameter derivation operation to determine one or more second parameters for a second block of the video data coded in a different mode. The video coder may then code (e.g., encode or decode) the first block of video data using the one or more first parameters and code the second block of video data using the one or more second parameters.

As used herein, the term "video coder" refers generically to both video encoders and video decoders. Similarly, in this disclosure, the terms "video coding" or "coding" may refer generically to video encoding or video decoding. Thus, unless stated otherwise, it should be assumed that techniques described with reference to coding may be performed by either a video encoder or a video decoder. In some portions of this application, certain techniques may be described with reference to video decoding or to a video decoder. It should not be assumed, however, that such techniques are not applicable to video encoding or may be not be performed by a video encoder. Such techniques may, for example, be performed as part of determining how to encode video data or may be performed as part of a video decoding loop in a video encoder.

As used in this disclosure, the term current block refers to a block currently being coded, as opposed to a block that is already coded or yet to be coded. Similarly, a current coding unit (CU), prediction unit (PU), or transform unit (TU), refers to a coding unit, prediction unit, or transform unit that is currently being coded.

Figure 1:
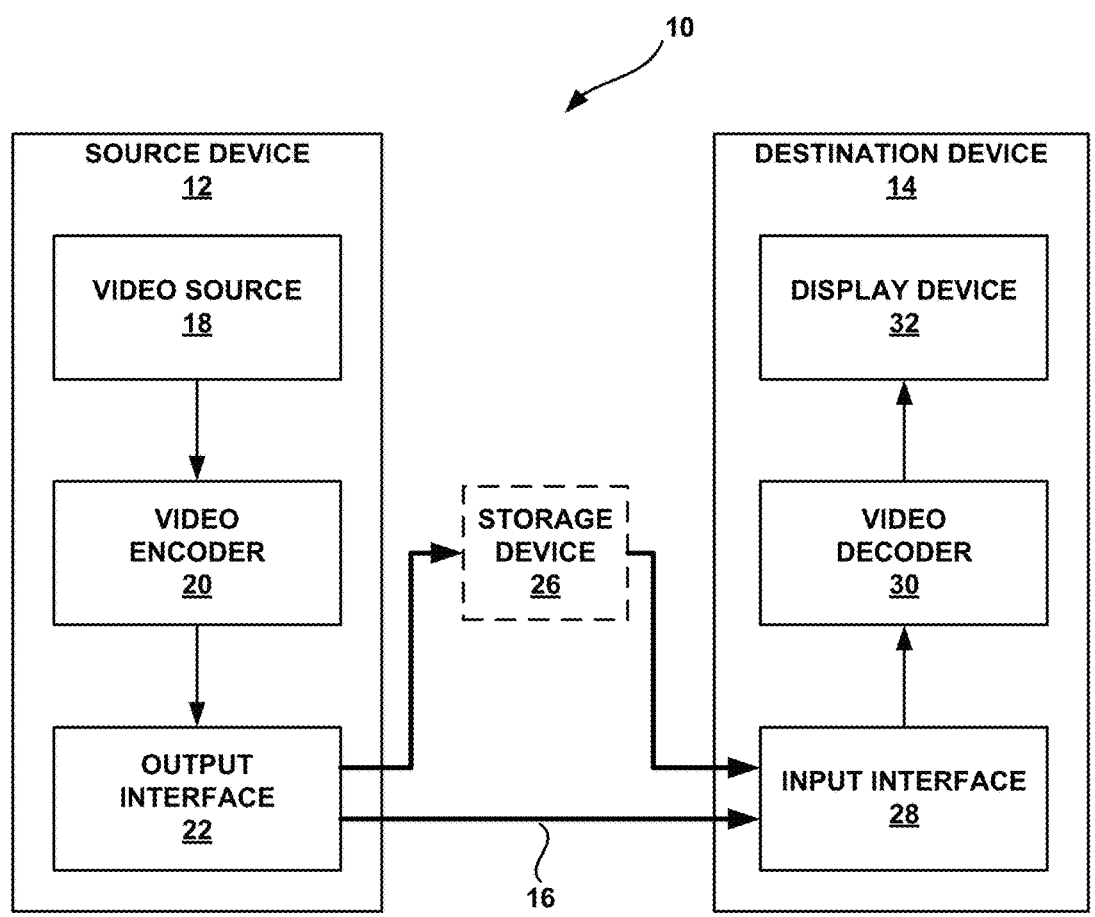
FIG. 1 is a block diagram illustrating an example video encoding and decoding system that may utilize the techniques described in this disclosure.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized High Efficiency Video Coding (HEVC) standard. Video encoder 20 and video decoder 30 may also operate according to one or more of the various extensions to HEVC, including the Scalable Video Coding (SVC) extension, the Multi-view Video Coding (MVC) extension, and the Screen content coding (SCC) extension.

Alternatively or additionally, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. Other examples of video coding standards include ITU-T H.261, ISO/IEC MPEG-1 Visual, ITU-T H.262, and ISO/IEC MPEG-2 Visual, ITU-T H.263. Examples of proprietary video codecs include Google VP8, VP9, VP10, and video codecs developed by other organizations such as the Alliance for Open Media. The techniques of this disclosure, however, are not limited to any particular coding standard.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC, including extensions of HEVC as well as next generation standards, including the new H.266 standard presently under development.

The Joint Video Exploration Team (WET) test model (also known as the Joint Exportation model or JEM) is a future video coding standard built on top of HEVC. In JEM, the basic encoding and decoding flowchart of HEVC is kept unchanged, but the design elements of some modules, including the modules for block structure, intra and inter prediction, residue transform, loop filter and entropy coding, are somewhat modified. JEM also introduces new coding tools.

Although not shown in FIG. 1, in some aspects, video encoder 20 and video decoder 30 may each be integrated with an audio encoder and audio decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has recently finalized development of the HEVC standard, ITU-T H.265. HEVC enables several additional capabilities of video coding devices relative to existing devices according to, e.g., ITU-T H.264/AVC. For example, whereas H.264 provides nine intra-prediction encoding modes, HEVC supports as many as thirty-five intra-prediction encoding modes.

In HEVC and other video coding specifications, a video sequence typically includes a series of pictures. Pictures may also be referred to as "frames." A picture may include three sample arrays, denoted $S_L$, $S_{Cb}$, and Scr. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more CUs. A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A TU of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RB SP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

LIC is a video coding tool that can be utilized by video encoder 20 and video decoder 30. In JEM, LIC is developed based on a linear model for illumination changes, using a scaling factor a and an offset b. LIC can be enabled or disabled based on the flag of each inter-mode CU.

When LIC is applied to a CU, the predicted signal in direction k is generated by $$\text{pred}_{LIC}(i,j,k) = a \cdot \text{pred}(i,j,k) + b \tag{1}$$

where $\text{pred}_{LIC}(i,j,k)$ represents the finally predicted signal in reference list k (k=0 or 1) and pred(i,j,k) represents the predicted signal based on some inter-prediction information such as reference index and motion vector from reference list k. Parameters a and b are derived by minimizing regression error between neighboring reconstructed and predicted samples around current block.

One example implementation of LIC will now be described, although the techniques of this disclosure are not limited to any particular implementation of LIC and may be compatible with other implementations. In this example implementation, for each inter-mode coded CU, a one-bit flag is explicitly signaled or implicitly derived to indicate the usage of LIC. When the flag is true, LIC parameters are implicitly derived for each PU/sub-PU belonging to the CU by using neighboring samples of the current CU and the corresponding pixels in the reference picture. Investigations into LIC have discovered that noticeable bitrate saving can be achieved on sequences with illumination variance. Even for normal sequences, such as HEVC CTC sequences, 0.36% and 0.33% bitrate saving have been achieved for random access and low delay configuration on average, respectively.

Weighted prediction aiming at global illumination compensation has been adopted into both H.264/AVC and HEVC. On the other hand, to compensate local illumination variance, block based illumination compensation has been proposed for HEVC, where the illumination compensation parameters are explicitly signaled at each partition. Meanwhile, LIC with implicit parameter derivation has been adopted into 3D-HEVC for inter-view prediction. In this example, LIC with implicit parameter derivation is proposed.

In one proposed method, LIC is enabled or disabled adaptively for each inter-mode coded CU, and LIC is applied using a linear model for illumination changes, using a scaling factor a and an offset b.

Figure 2:
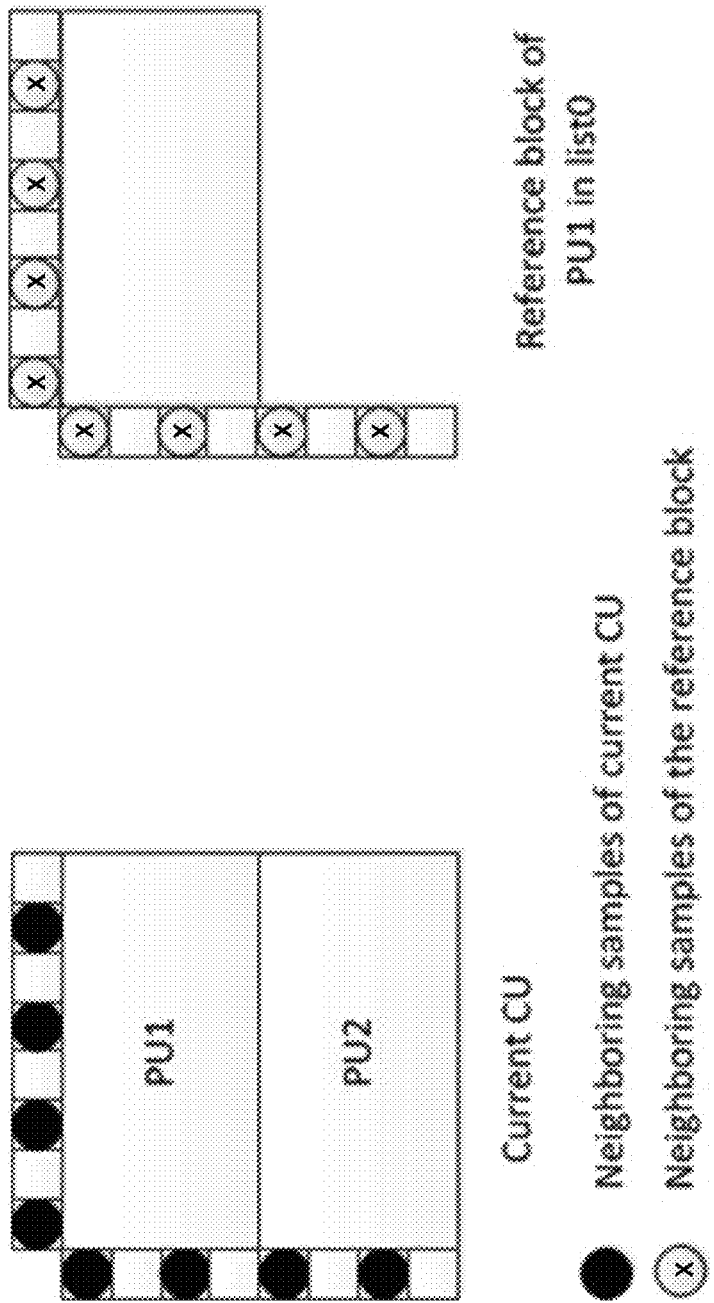
FIG. 2 shows an example of neighboring samples used for deriving IC parameters.

FIG. 2 shows an example of neighboring samples used for deriving IC parameters. When a CU is coded with 2N×2N merge mode, the LIC flag is copied from neighboring blocks, in a way similar to motion information copy in merge mode; otherwise, an LIC flag is signaled for the CU to indicate whether LIC applies or not. When LIC applies for a CU, for each PU/sub-PU belonging to the CU, LIC parameters are derived in a manner similar to the derivation done for the inter-view illumination compensation in, i.e., by using subsampled (2:1 subsampling) neighboring samples of the CU and the corresponding pixels (identified by motion information of the current PU/sub-PU) in the reference picture. An example is illustrated in FIG. 2. The IC parameters are derived and applied for each prediction direction separately. A least square error method is employed to derive the parameters a and b based on the abovementioned neighboring samples.

For each merge candidate, besides motion information (motion vector, prediction direction, reference index etc.), one LIC flag is also generated, following the rules listed below.

For a spatial merge candidate, the LIC flag is set equal to that of the corresponding spatial neighboring block.

For a temporal merge candidate, the LIC flag is set equal to that of the corresponding temporal co-located block. For bi-prediction case, motion information may be derived from two different temporal co-located blocks. In this case, LIC flag of temporal merge candidate is set to true if any of the two co-located blocks uses LIC and set to false otherwise.

A combined bi-predictive candidate is generated from two spatial/temporal merge candidates, and the LIC flag is set to true if the LIC flag of any of the two source candidates is true and set to false otherwise.

For the tailing zero merge candidates, LIC flag is always set to false.

Meanwhile, LIC flag is considered in the pruning process, and two merge candidates are considered as different if the two merge candidates have different LIC flags.

In OBMC, when performing motion compensation using neighboring motion information, the LIC flag of the current CU (instead of the neighboring block) applies. When the LIC flag of the current CU is true, in the motion compensation process for a neighboring motion information, LIC parameters are derived by using neighboring samples of the current CU and corresponding pixels identified by the neighboring motion information. OBMC is described in more detail below.

To reduce the encoder complexity, LIC can be disabled for the entire picture when there is no significant illumination change between a current picture and reference pictures of the current picture. To identify this situation, histograms of current picture and every reference picture are calculated at the encoder. If the histogram difference between current picture and every reference picture is smaller than a given threshold, LIC is disabled for the current picture; otherwise, LIC is enabled. Furthermore, LIC is disabled for CU coded with non-2N×2N partition modes.

CCLM prediction is another coding tool used for predicting blocks that can be utilized by video encoder 20 and video decoder 30. By utilizing the cross component correlation in video sequences, in intra-predicted CUs, CCLM can be applied to reduce the cross component redundancy. In CCLM, chroma samples are predicted based on reconstructed luma samples of the same block by using the following linear model:

$$pred_C(i,j) = a \cdot rec_L(i,j) + b \qquad (2)$$

where $pred_C(i,j)$ represents the prediction of chroma samples in a block and $rec_L(i,j)$ represents the reconstructed luma samples of the same block (reconstructed luma samples could be downsampled where needed, such as when CCLM is applied to YUV 4:2:0 video sequences). Parameters a and b are derived by minimizing regression error between neighboring reconstructed luma and reconstructed chroma samples around the current block.

In JEM, CCLM is extended to the prediction between two chroma components, i.e. using Cb component to predict Cr component in residual domain. The final Cr predictor is generated by the following equation:

$$pred^*_{Cr}(i,j) = pred_{Cr}(i,j) + \alpha \cdot resi_{Cb}'(i,j) \qquad (3)$$

where $pred^*_{Cr}(i,j)$ represents the finally predicted signal of Cr component, $pred_{Cr}(i,j)$ represents the Cr predicted signal based on the signaled intra prediction mode and $resi_{Cb}'(i,j)$ is the reconstructed Cb residual signal. Parameter a is derived by minimizing regression error between neighboring reconstructed Cb and Cr samples.

One example implementation of cross component prediction will now be described. It was known that coding performance can be improved by utilizing the cross component correlation existing even in YUV 4:2:0 video sequences. In this example, the CCLM prediction mode in HM 7.0 and its enhancement are evaluated. In CCLM mode, the chroma samples are predicted based on reconstructed luma samples of the same block by using a linear model as follows:

$$pred_C(i,j) = a \cdot rec_L(i,j) + b$$

where $pred_C(i,j)$ represents the prediction of chroma samples in a block and $rec_L(i,j)$ represents the downsampled reconstructed luma samples of the same block. Parameters a and b are derived by minimizing regression error between the neighboring reconstructed luma and chroma samples around the current block.

In this example, the CCLM prediction mode is extended to the prediction between two chroma components, i.e. Cr component is predicted from Cb component. Instead of using the reconstructed sample signal, the cross component prediction is applied in residual domain. This is implemented by adding a weighted reconstructed Cb residual to the original Cr intra prediction to form the final Cr prediction:

$$pred^*_{Cr}(i,j) = pred_{Cr}(i,j) + \alpha \cdot resi_{Cb}'(i,j)$$

The scaling factor α is derived in as in CCLM mode. The only difference is an addition of a regression cost relative to a default α value in the error function so that derived scaling factor is biased towards the default value (−0.5).

OBMC is a coding tool used for predicting blocks. In JEM, OBMC is applied to 4×4 sub-blocks. When OBMC is applied to the current sub-block, besides motion information of current block itself, motion information (prediction direction, reference frame index and motion vectors) of four connected neighbouring sub-blocks, if available and are not identical to the current motion information, are also used to derive prediction block for the current sub-block. These multiple prediction blocks are combined to generate the final prediction signal of the current sub-block with weighted factors.

Figure 3:
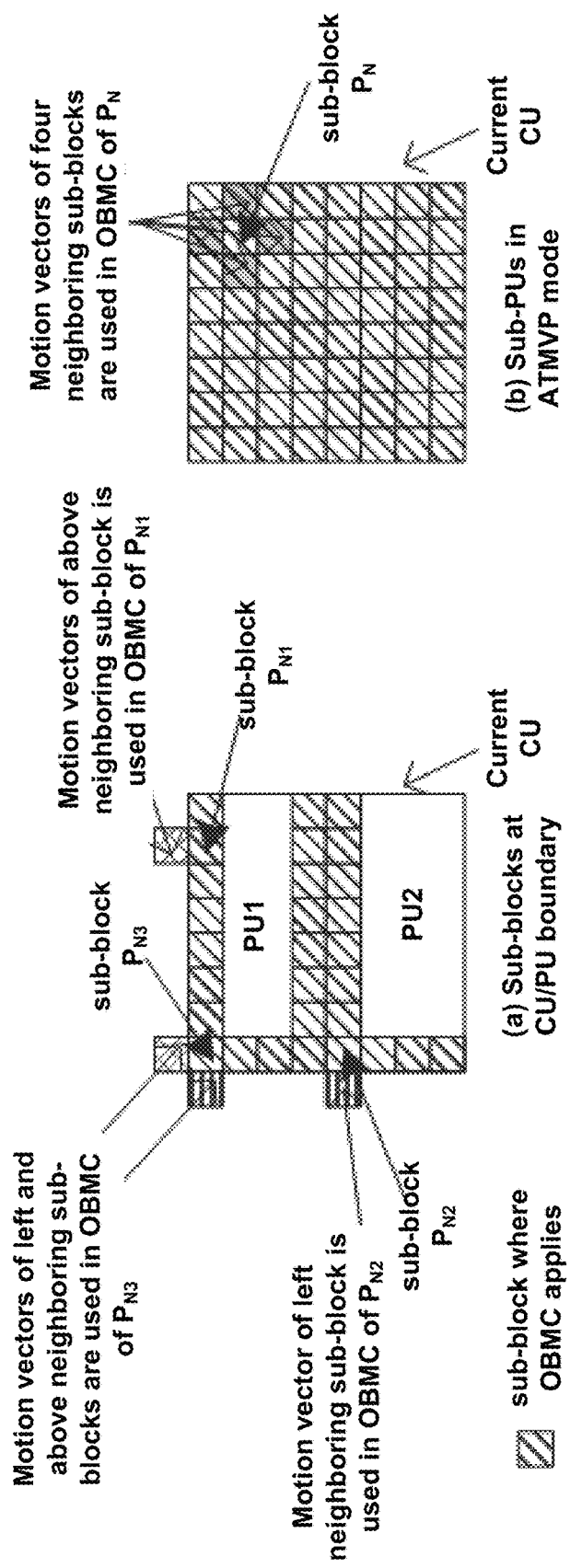
FIG. 3 shows an example illustration of sub-blocks where OBMC may apply.

One example implementation of OBCM will now be described. OBMC has been proposed for early generations of video standards. In this example, the OBMC is performed for all Motion Compensated (MC) block boundaries except the right and bottom boundaries of a CU. Moreover, OBMC may be applied for both luma and chroma components. In HEVC, a MC block is corresponding to a PU. When a PU is coded with ATMVP mode, each sub-block of the PU is a MC block. To process CU/PU boundaries in a uniform fashion, OBMC is performed at sub-block level for all MC block boundaries, where sub-block size is set equal to 4×4, as illustrated in FIG. 3.

When OBMC applies to the current sub-block, besides current motion vectors, motion vectors of four connected neighboring sub-blocks, if available and are not identical to the current motion vector, are also used to derive prediction block for the current sub-block. These multiple prediction blocks based on multiple motion vectors are weighted to generate the final prediction signal of the current sub-block.

For purposes of example, denote prediction block based on motion vectors of a neighboring sub-block as $P_N$, with N indicating an index for the neighboring above, below, left and right sub-blocks and let's denote the prediction block based on motion vectors of the current sub-block as $P_C$. When $P_N$ belongs to the same PU as $P_C$ (thus contains the same motion information), the OBMC is not performed from $P_N$. Otherwise, every pixel of $P_N$ is added to the same pixel in $P_C$, i.e., four rows/columns of $P_N$ are added to $P_C$. The weighting factors $\{1/4, 1/8, 1/16, 1/32\}$ are used for $P_N$ and the weighting factors $\{3/4, 7/8, 15/16, 31/32\}$ are used for $P_C$. The exception are small MC blocks, (i.e., when PU size is equal to 8×4, 4×8 or a PU is coded with ATMVP mode), for which only two rows/columns of $P_N$ are added to $P_C$. In this case weighting factors $\{1/4, 1/8\}$ are used for $P_N$ and weighting factors $\{3/4, 7/8\}$ are used for $P_C$. For $P_N$ generated based on motion vectors of vertically (horizontally) neighboring sub-block, pixels in the same row (column) of $P_N$ are added to $P_C$ with a same weighting factor.

Weighted prediction is another coding tool used for predicting blocks that can be utilized by video encoder 20 and video decoder 30. In HEVC and JEM, weighted prediction can be applied after predicted blocks from all available reference lists are derived.

If weightedPredFlag is 0, the default weighted sample prediction process is applied. For example, when both reference lists are available, the finally predicted signal is calculated as $$pred_{Final}(i,j) = (pred_{B1}(i,j,0) + pred_{B1}(i,j,1) + Off_2) >> shift_2 \qquad (4)$$

where $shift_2 = \max(3, 1+prec_{IF}-BD)$, $prec_{IF}$ is the internal precision of interpolation filter, BD is the bit depth of reconstructed signals and $Off_2 = 1<<(shift_2-1)$, and $pred_{BI}(i,j,k)$ can be calculated as $$pred_{BI}(i,j,k) = [pred_{LIC}(i,j,k) << (prec_{IF}-BD)] - [1<<(prec_{IF}-1)] \qquad (5)$$

If weightedPredFlag is 1, the explicit weighted sample prediction process is applied. For example, if only one reference list is available, the finally predicted signal is calculated as follows.

If $\log_2 W_d \geq 1$, $$pred_{Final}(i,j) = ((pred_{B1\_WP}(i,j,k)*w_k + 2^{\log_2 w_d - 1})) >> \log_2 W_d) + Off_k \qquad (6)$$

Else, $$pred_{Final}(i,j) = pred_{B1\_WP}(i,j,k)*w_k + Off_k \qquad (7)$$

For example, when both reference lists are available, the finally predicted signal is calculated as $$pred_{Final}(i,j) = (pred_{B1\_WP}(i,j,0)*w_0 + pred_{BI\_WP}(i,j,1)*w_1 + ((Off_0 + Off_1 + 1) << \log_2 W_d)) >> (\log_2 W_d + 1) \quad (8)$$

where $\log_2 W_d$ is calculated based on some signaled parameters, $w_k$ and $Off_k$ are derived from some look-up table based on reference index in the corresponding reference list and $pred_{BI\_WP}(i,j,k)$ can be calculated as $$pred_{BI\_WP}(i,j,k) = [pred(i,j,k) << (prec_{IF} - BD)] - [1 << (prec_{IF} - 1)] \quad (9)$$

When explicit weighted sample prediction process is applied, LIC is disabled.

Existing techniques related to the various coding tools introduced above have several potential problems. As one example, both of LIC and CCLM minimize the regression error to derive parameters a and b in the linear models. However, currently, JEM, LIC, and CCLM each have their own procedures to determine the parameters. There are some differences between those two, such as the accuracy in the integer version of linear regression. Using two procedures may introduce complexity in adjusting the implementation, such as when the internal bit depth changes. If both of these two parts are implemented it will increase the size of encoder and decoder. Therefore, it is desirable to unify these two procedures.

In JEM, the integer version of LIC is represented as:

$$pred_{LIC}(i,j,k) = \{[a \cdot pred(i,j,k)] >> c\} + b \quad (10)$$

where c represents the number of bits used for fractional parts of a. When default weighted sample prediction process is applied, equation (5) becomes $$pred_{B1}(i,j,k) = ((\{[a \cdot pred(i,j,k)] >> c\} + b) << (prec_{IF} - BD)) - [1 << (prec_{IF} - 1)] \quad (11)$$

It can be seen that the predicted signals are right shifted by c followed by being left shifted by $prec_{IF}$–BD which will lose some data in lower bits and result in lower prediction efficiency.

Explicit weighted sample prediction is similar to LIC in the sense of linear model. Equations (2) and (7) can be taken as an example. There is the same problem as described above. This disclosure introduces techniques for unifying weighted sample prediction and LIC.

In JEM, OBMC is applied to a current block if any one, or more than one, of a prediction direction, a reference frame index, or a motion vectors of an available neighboring block's motion information is different than the current block. However, the LIC flags are not considered. When LIC flags of neighboring and current blocks are different, even if all the motion information described above of the two blocks is the same, there may still be a difference in local illumination. Therefore, OBMC may be beneficial for this case but is unavailable.

To potentially resolve the problems introduced above, the following techniques are proposed. The following techniques may be applied individually, or alternatively, may be applied in any combination. To address the problems introduced above, this disclosure introduces techniques for using a common method for regression parameter derivation for multiple coding tools. In other words, according to the techniques, different coding tools may use the same regression parameter derivation process. The process for parameter derivation may be either an already existing process, including one of the processes described in this disclosure, or may be a yet-to-be-developed process. Either way, the same process may be used for multiple coding tools.

The process unification techniques of this disclosure may be performed for video coding tools or any color component to which a particular video coding tool is applied. For example, the unification can be done only for a luma color component for selected tools, or only for chroma color components, or for both, or in any combination. As an example, a unified parameter derivation process may be used for one color component in one tool and another color component for another tool.

Some examples of unifications, e.g. sharing the process for parameter derivation among several tools, are provided in this disclosure. It should be understood, however, that the methods of unification described herein are not limited only to the provided examples and may, for instance, be applied to other color components.

For the procedures with same functionality, it may be better to unify such procedures, which may potentially save chip area or software size of both encoder and decoder and may also make it easier to adjust the implementation. For example, the linear regression parts to derive a and b in both LIC and CCLM, the linear models in LIC and explicit weighted sample prediction. In the future, if some other tools use linear regression, the existed procedures can be reused. In addition, this unification technique can be extended to other scenarios, where there exist procedures with similar functionality.

This disclosure proposes techniques for unification of parameter derivation procedures for LIC and CCLM prediction. Instead of using two different linear regression procedures for LIC and CCLM to derive parameters a and b in the linear models, a unified procedure can be used to save the size of both of encoder and decoder. For example, LIC can re-use CCLM's linear regression's process, CCLM can re-use LIC's linear regression's process, or a new unified process can be implemented for both of them. When a unified procedure is used, the implementation of codec is easier to be adjusted in some cases such as internal bit depth change and in some data overflow issues.

In linear regression, parameters a and b can be derived by minimizing regression error between neighboring samples in the following way:

$$a = \frac{N \cdot \sum(L(n) \cdot C(n)) - \sum L(n) \cdot \sum C(n) + \text{Offset1}}{N \cdot \sum(L(n) \cdot L(n)) - \sum L(n) \cdot \sum L(n) + \text{Offset2}} \quad (12)$$

$$b = \frac{\sum C(n) - a \cdot \sum L(n)}{N} \quad (13)$$

Where N is the number of samples, C(n) are neighboring reconstructed samples (with or without downsampling or subsampling) of the current block and L(n) is neighboring reconstructed samples (with or without downsampling or subsampling) of the reference block, Offset1 and Offset2 are two offsets that can be applied to make a biased to some default value. How to select (n), C(n), Offset1 and Offset2 depends on whether the linear regression is applied for LIC, luma to chroma in CCLM or Cb to Cr in CCLM. For example, in LIC and CCLM, L(n) and C(n) are selected as the following table:

| | LIC (luma, Cb or Cr) | CCLM: luma to chroma | CCLM: Cb to Cr |
|---|---|---|---|
| L(n) | Neighboring reconstructed samples of reference block | Downsampled neighboring reconstructed luma samples | Neighboring reconstructed Cb samples |
| C(n) | Neighboring reconstructed samples of current block | Neighboring reconstructed chroma samples | Neighboring reconstructed Cr samples |

The unified function can be called in the following way:

$$(a,b,c) = \text{linear\_regression}(N, \Sigma(L(n) \cdot C(n)), \Sigma C(n), \Sigma L(n), t, BD) \quad (14)$$

where t defines whether the procedure is used for LIC, luma to chroma in CCLM or Cb to Cr in CCLM. The inputs are N, $\Sigma(L(n) \cdot C(n))$, $\Sigma C(n)$, $\Sigma L(n)$, t. Outputs are a, b and c. In the unified version, c, which represents the number of bits used for fractional parts of a can be fixed. Alternatively, it can be adaptive to BD and the magnitude of a.

The values of offset1 and offset2, or the way to derive the value of offset1 and offset2 depend on which method the linear regression process is used, e.g. the parameter t in equation (14). In one example, one specific way to derive the value of offset1 and offset2 is predefined for each tool the linear regression process is used. In another example, a few alternative ways to derive the value of offset1 and offset2 are predefined for each tool the linear regression process is used, and indices or flags are signaled in bitstream to indicate which way is applied, respectively for each tool.

This disclosure introduces techniques for the adjustment of bi-prediction when LIC is applied. To resolve the precision loss problem described above, when bi-prediction and LIC are both applied to a block, in equation (11), the right shifting by LIC ($\text{prec}_{IF}$–BD) applied to the predictor can be applied before the left shifting by c bits in LIC. When doing this, the offset applied in equation (10) will be added to b. In addition, in the unified process in (14), the input t can be used to define whether bi-prediction is applied together with LIC, see the following table as an example:

| Value of t | Description |
|---|---|
| 0 | LIC without bi-prediction |
| 1 | LIC with bi-prediction |
| 2 | CCLM: luma to chroma |
| 3 | CCLM: Cb to Cr |

This disclosure introduces techniques for the unification of explicit weighted prediction. As the linear models in explicit weighted prediction and LIC are similar, those two linear models can be unified, for example, LIC can reuse explicit weighted prediction's linear model. However, there may be some adjustment. For example, after prediction of all available reference lists, explicit weighted prediction uses reference indices to generate the corresponding $w_k$ and $\text{Off}_k$. However, when applied for LIC, a and b should be used as additional inputs or should be derived at the beginning of explicit weighted prediction.

This disclosure introduces techniques related to the condition of OBMC. Instead of only checking whether the motion information between neighboring and current blocks, LIC flags between them can be also checked.

For example, if LIC flags are different (other motion information is the same), OBMC can be applied, which would not happen (OBMC is applied) if LIC flags are not checked.

In one specific example, the prediction direction, reference frame index, motion vectors, and LIC flag of neighboring and current blocks may be checked to derive the decision about OBMC usage. For example, if any of the prediction direction, reference frame index, motion vectors, and LIC flag between a neighboring block and current block is different, then OBMC may be applied based on the prediction direction, reference frame index, motion vectors, and LIC flag of that neighboring block.

Figure 4:
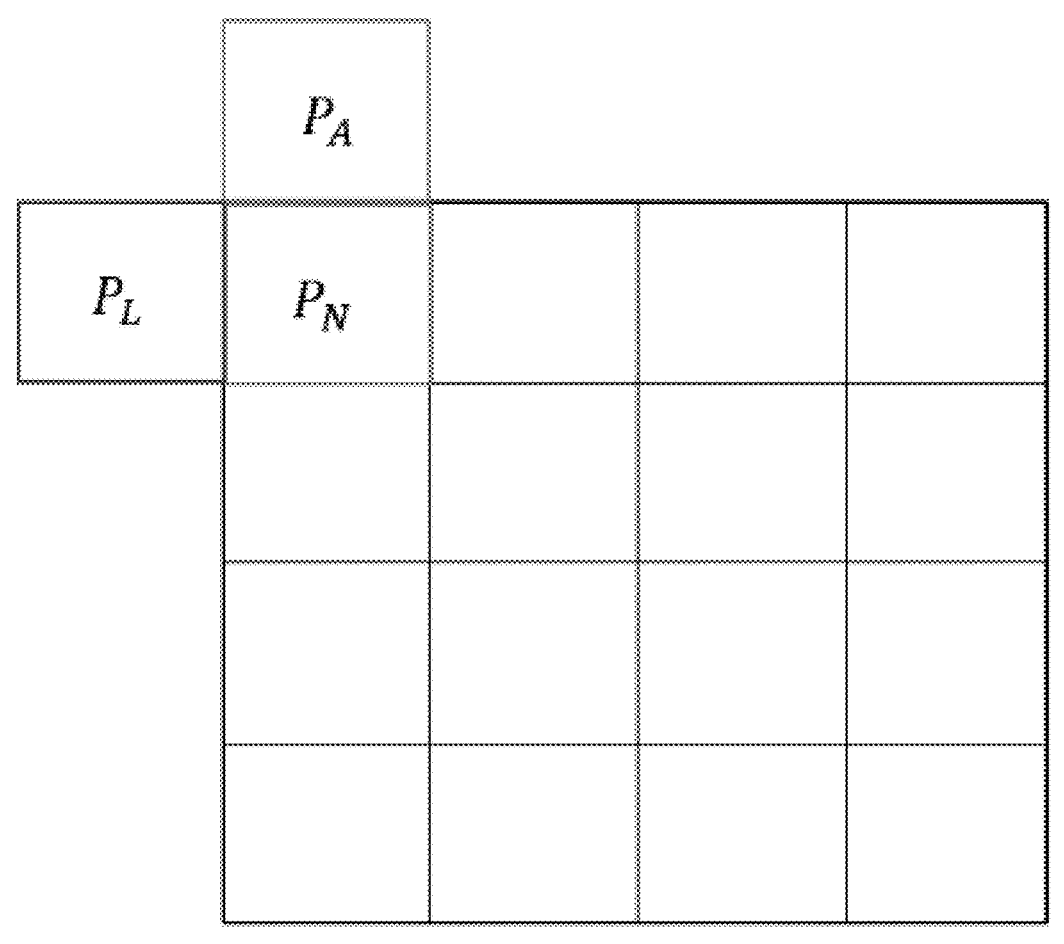

FIG. 4 shows an example of a current block and two neighboring blocks. When OBMC is applied to current 4×4 sub-block $P_N$ based on above sub-block $P_A$ and left sub-block $P_L$ in order. Take $P_A$ as an example, the prediction direction, reference frame index, motion vectors and LIC flag of $P_N$ and $P_A$ are compared, if anyone, e.g. LIC flags are different, copy $P_A$'s motion information to $P_N$, derive another predictor of $P_N$, add it to the prior predictor of $P_N$ to get the new predictor for $P_N$. After adding the two predictors together, restore $P_N$'s motion information.

Figure 5:
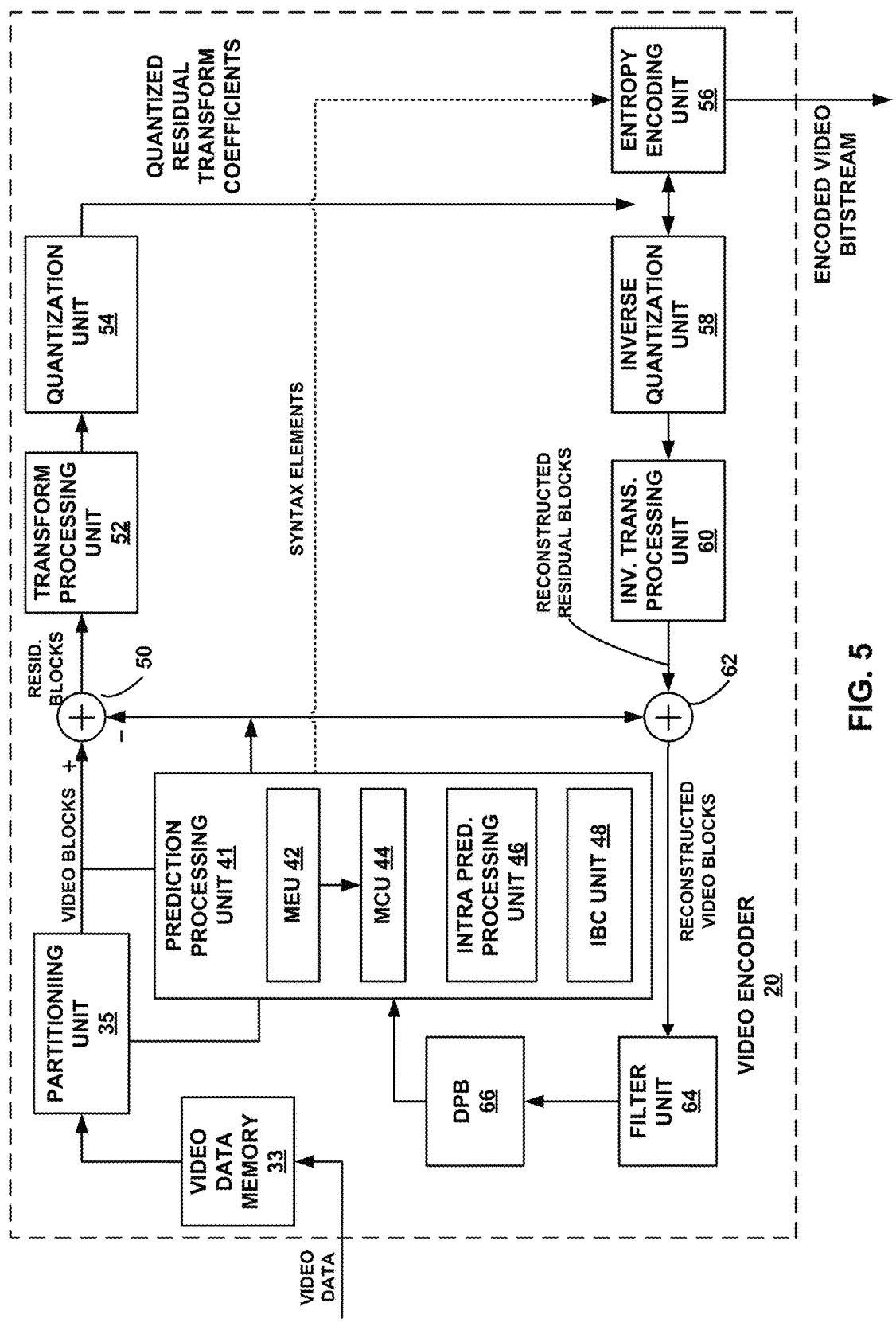
FIG. 5 is a block diagram illustrating an example video encoder that may implement the techniques described in this disclosure.

FIG. 5 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 5, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, intra prediction processing unit 46, and intra block copy (IBC) unit 48. Although shown separately in FIG. 5 for ease of explanation, it should be understood that MEU 42, MCU 44, intra prediction processing unit 46, and IBC unit 48 may in fact be highly integrated. For video block reconstruction, video encoder 20 also includes inverse quantization unit 58, inverse transform processing unit 60, summer 62, filter unit 64, and decoded picture buffer (DPB) 66.

As shown in FIG. 5, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and, in conjunction with prediction processing unit 41, partitions the video data into video blocks.

This partitioning may also include partitioning into slices, tiles, or other larger units, as wells as video block partitioning, e.g., according to a quadtree structure of LCUs and CUs. Although shown separately for purposes of example, partitioning unit 35 and prediction processing unit 41 may be highly integrated, and both partitioning unit 35 and prediction processing unit 41 may perform aspects of the process of determining how to partition a picture of video. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. For some CUs, intra prediction processing unit 46 may encode blocks using CCLM as described above. MEU 42 and MCU 44 within prediction processing unit 41 perform inter-predictive coding of the current video block relative to one or more predictive blocks in one or more reference pictures to provide temporal compression. Motion estimation, performed by MEU 42, is the process of generating motion vectors, which estimate motion for video blocks. A motion vector, for example, may indicate the displacement of a PU of a video block within a current video frame or picture relative to a predictive block within a reference picture. In some examples, IBC may be considered to be a special case of inter prediction, in which case functionality attributed to IBC unit 48 may be considered to be performed by MEU 42 and/or MCU 44. For some blocks, MEU 42 and/or MCU 44 may perform LIC as described above.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, MEU 42 may perform a motion search relative to the full pixel positions and fractional pixel positions and output a motion vector with fractional pixel precision.

MEU 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. MEU 42 sends the calculated motion vector to entropy encoding unit 56 and MCU 44.

Motion compensation, performed by MCU 44, may involve fetching or generating the predictive block based on the motion vector determined by motion estimation, possibly performing interpolations to sub-pixel precision. Upon receiving the motion vector for the PU of the current video block, MCU 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. MCU 44 may also generate syntax elements associated with the video blocks and the video slice for use by video decoder 30 in decoding the video blocks of the video slice.

In some examples, IBC unit 48 may generate two-dimensional vectors and fetch predictive blocks in a manner similar to that described above with respect to MEU 42 and MCU 44, but with the predictive blocks being in the same picture or frame as the current block. In other examples, IBC unit 48 may use MEU 42 and MCU 44, in whole or in part, to perform such functions for IBC prediction according to the techniques described herein. In either case, for IBC, a predictive block may be a block that is found to closely match the block to be coded, in terms of pixel difference, which may be determined by SAD, SSD, or other difference metrics, and identification of the block may include calculation of values for sub-integer pixel positions.

After prediction processing unit 41 generates the predictive block for the current video block, via intra prediction, inter prediction, or IBC, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. MCU 44 may calculate a reference block by adding the residual block to a predictive block of one of the reference pictures within one of the reference picture lists. MCU 44 may also apply one or more interpolation filters to the reconstructed residual block to calculate sub-integer pixel values for use in motion estimation. Summer 62 adds the reconstructed residual block to the motion compensated prediction block produced by MCU 44 to produce a reconstructed block.

Filter unit 64 filters the reconstructed block (e.g. the output of summer 62) and stores the filtered reconstructed block in DPB 66 for uses as a reference block. The reference block may be used by MEU 42 and MCU 44 as a reference block to inter-predict a block in a subsequent video frame or picture. Filter unit 64 may apply one or more of deblocking filtering, sample adaptive offset (SAO) filtering, adaptive loop filtering (ALF), or other types of loop filtering. Filter unit 64 may apply deblocking filtering to filter block boundaries to remove blockiness artifacts from reconstructed video and may apply other types of filtering to improve overall coding quality. Additional loop filters (in loop or post loop) may also be used.

Figure 6:
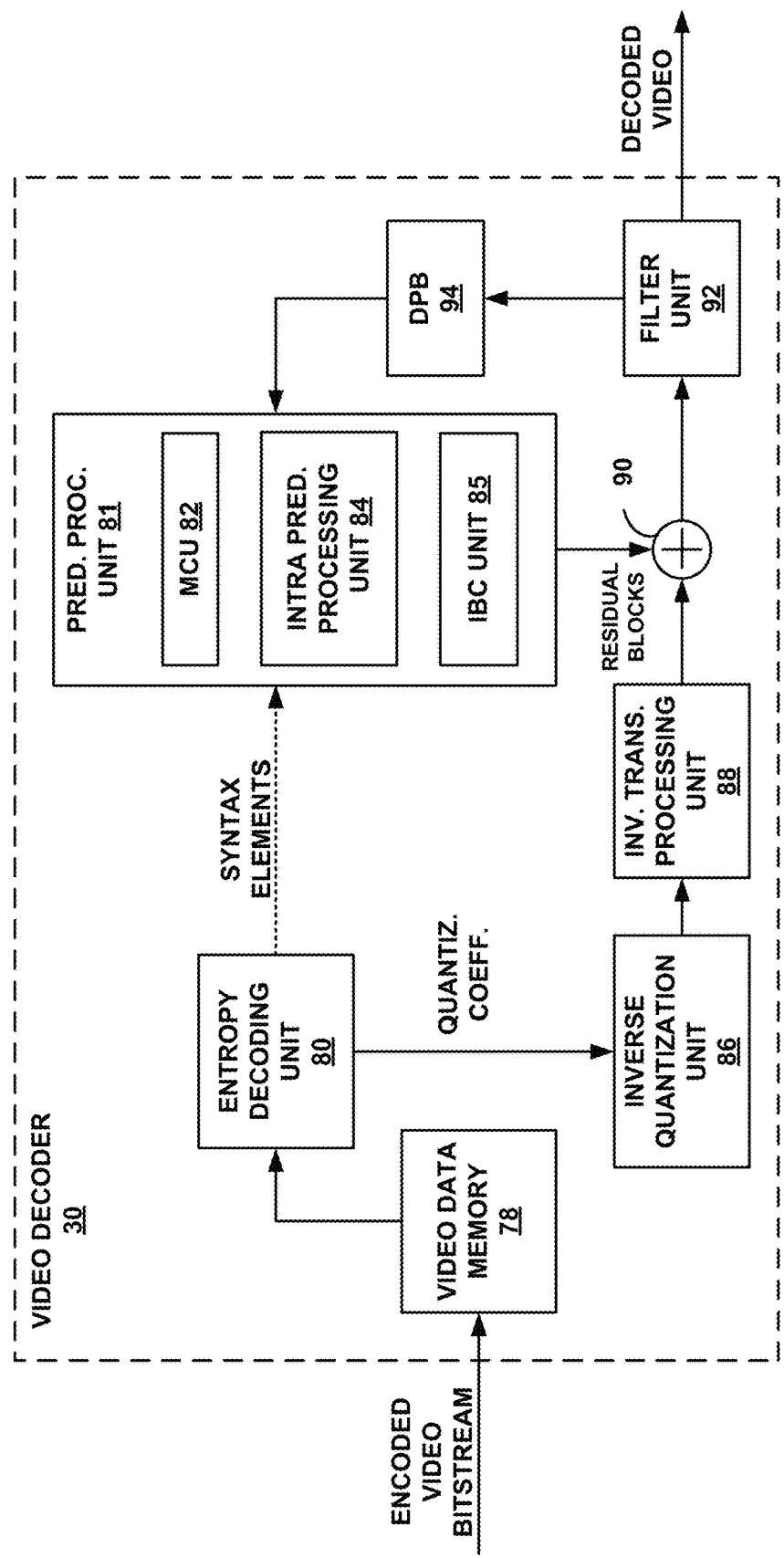
FIG. 6 is a block diagram illustrating an example video decoder that may implement the techniques described in this disclosure.

FIG. 6 is a block diagram illustrating an example video decoder 30 that may implement the techniques described in this disclosure. In the example of FIG. 6, video decoder 30 includes video data memory 78, entropy decoding unit 80, prediction processing unit 81, inverse quantization unit 86, inverse transform processing unit 88, summer 90, filter unit 92, and DPB 94. Prediction processing unit 81 includes MCU 82, intra prediction processing unit 84, and IBC unit 85. Video decoder 30 may, in some examples, perform a decoding pass generally reciprocal to the encoding pass described with respect to video encoder 20 from FIG. 5.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. For some CUs, intra prediction processing unit 84 may decode blocks using CCLM as described above. When the video frame is coded as an inter-coded, MCU 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

MCU 82 and/or IBC unit 85 determine prediction information for a video block of the current video slice by parsing the motion vectors and other syntax elements and use the prediction information to produce the predictive blocks for the current video block being decoded. For example, MCU 82 uses some of the received syntax elements to determine a prediction mode (e.g., intra- or inter-prediction or IBC) used to code the video blocks of the video slice, construction information for one or more of the reference picture lists for the slice, motion vectors for each inter-encoded video block of the slice, inter-prediction status for each inter-coded video block of the slice, and other information to decode the video blocks in the current video slice. In some examples, IBC may be considered to be a special case of inter prediction, in which case functionality attributed to IBC unit 85 may be considered to be performed by MCU 82. For some blocks, MCU 82 may perform LIC as described above.

MCU 82 and/or IBC unit 85 may also perform interpolation based on interpolation filters. MCU 82 and/or IBC unit 85 may use interpolation filters as used by video encoder 20 during encoding of the video blocks to calculate interpolated values for sub-integer pixels of reference blocks. In this case, MCU 82 and/or IBC unit 85 may determine the interpolation filters used by video encoder 20 from the received syntax elements and use the interpolation filters to produce predictive blocks. For some blocks, MCU 82 may also perform LIC as described above.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by MCU 82. Summer 90 represents the component or components that perform this summation operation. Filter unit 92 filters the reconstructed video block using, for example, one or more of deblocking filtering, SAO filtering, ALF filtering, or other types of filtering. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Figure 7:
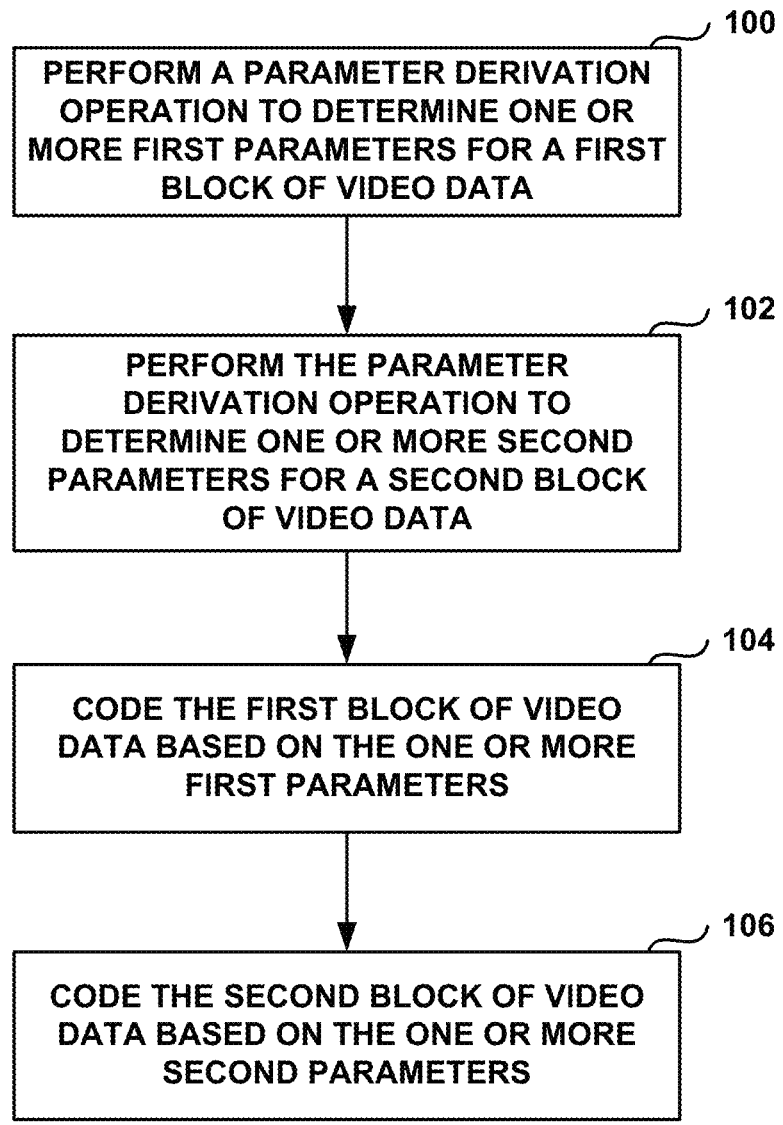
FIG. 7 is a flowchart illustrating an example operation of a video coder, in accordance with techniques of this disclosure.

FIG. 7 is a flowchart illustrating an example operation of a video coder, in accordance with techniques of this disclosure. Unless specified, the actions of the operation of FIG. 7 may be performed by either video encoder 20 or video decoder 30. In other examples, actions of FIG. 7 may be performed in different orders or in parallel. Other operations may include more, fewer, or different actions.

In the example of FIG. 7, the video coder performs a parameter derivation operation to determine one or more first parameters for a first block of video data (100). The video coder performs the parameter derivation operation to determine one or more second parameters for a second block of video data (102). The second block of video data is coded in a different coding mode than the first block of video data. The video coder codes the first block of video data based on the one or more first parameters (104) and codes the second block of video data based on the one or more second parameters (106).

The first block may, for example, be coded using an LIC mode, and the second block may be coded using a CCLM mode. The first one or more parameters may include first alpha and beta parameters as described above, and the second one or more parameters may include second alpha and beta parameters as described above. The parameter derivation operation may, for example, include a linear regression operation that minimizes regression error between neighboring samples.

In other examples, the first block may be coded using an LIC mode and the second block may be coded using weighted sample prediction. The parameter derivation operation may include a linear model.

When the video coder is a video decoder, the techniques of FIG. 10 may further include receiving the video data at a receiver of a wireless communication device, storing the video data in a memory of the wireless communication device, and processing the video data on one or more processors of the wireless communication device. The wireless communication device may, for example, be a telephone handset that, as part of receiving the video data at the receiver of the wireless communication device, demodulates, according to a wireless communication standard, a signal that includes the video data.

When the video coder is a video encoder, the techniques of FIG. 10 may further include storing the video data in a memory of a wireless communication device, processing the video data on one or more processors of the wireless communication device, and transmitting the video data from a transmitter of the wireless communication device. The wireless communication device may, for example, include a telephone handset, and the telephone handset may transmit the video data at the transmitter of the wireless communication device by modulating, according to a wireless communication standard, a signal comprising the video data.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, including fixed function and/or programmable processing circuitry, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
for a first block of video data, performing a parameter derivation operation to determine one or more first parameters for the first block of video data;
for a second block of video data, performing the parameter derivation operation to determine one or more second parameters for the second block of video data;
coding the first block of video data using the one or more first parameters for a local illumination compensation (LIC) mode; and
coding the second block of video data using the one or more second parameters for one of a cross-component linear mode or weighted sample prediction.

2. The method of claim 1, wherein the second block is coded using the cross-component linear mode, and wherein the first one or more parameters comprises first alpha and beta parameters and the second one or more parameters comprise second alpha and beta parameters.

3. The method of claim 2, wherein the parameter derivation operation comprises a linear regression operation.

4. The method of claim 3, wherein the linear regression operation comprises minimizing regression error between neighboring samples.

5. The method of claim 1, wherein the second block is coded using weighted sample prediction.

6. The method of claim 5, wherein the parameter derivation operation comprises a linear model.

7. The method of claim 1, further comprising:
receiving the video data at a receiver of a wireless communication device;
storing the video data in a memory of the wireless communication device; and
processing the video data on one or more processors of the wireless communication device.

8. The method of claim 7, wherein the wireless communication device comprises a telephone handset and wherein receiving the video data at the receiver of the wireless communication device comprises demodulating, according to a wireless communication standard, a signal comprising the video data.

9. A device for coding video data, the device comprising:
a memory storing video data; and
a video coder comprising one or more processors implemented in circuitry, the one or more processors configured to:
for a first block of video data, perform a parameter derivation operation to determine one or more first parameters for the first block of video data;
for a second block of video data, perform the parameter derivation operation to determine one or more second parameters for the second block of video data;
code the first block of video data using the one or more first parameters for a local illumination compensation (LIC) mode; and
code the second block of video data using the one or more second parameters for one of a cross-component linear mode or a weighted sample prediction.

10. The device of claim 9, wherein the second block is coded using the cross-component linear mode, and wherein the first one or more parameters comprises first alpha and beta parameters and the second one or more parameters comprise second alpha and beta parameters.

11. The device of claim 10, wherein the parameter derivation operation comprises a linear regression operation.

12. The device of claim 11, wherein the linear regression operation comprises minimizing regression error between neighboring samples.

13. The device of claim 9, wherein the second block is coded using weighted sample prediction.

14. The device of claim 13, wherein the parameter derivation operation comprises a linear model.

15. The device of claim 9, wherein the device comprises a wireless communication device, further comprising a receiver configured to receive encoded video data.

16. The device of claim 15, wherein the wireless communication device comprises a telephone handset and wherein the receiver is configured to demodulate, according to a wireless communication standard, a signal comprising the encoded video data.

17. The device of claim 9, wherein the device comprises a wireless communication device, further comprising a transmitter configured to transmit encoded video data.

18. The device of claim 17, wherein the wireless communication device comprises a telephone handset and wherein the transmitter is configured to modulate, according to a wireless communication standard, a signal comprising the encoded video data.

19. The device of claim 9, wherein to code the first block of video data based on the one or more first parameters, the one or more processors are configured to decode the first block of video data based on the one or more first parameters, and wherein to code the second block of video data based on the one or more second parameters, the one or more processors are configured to decode the second block of video data based on the one or more second parameters.

20. The device of claim 9, wherein to code the first block of video data based on the one or more first parameters, the one or more processors are configured to encode the first block of video data based on the one or more first parameters, and wherein to code the second block of video data based on the one or more second parameters, the one or more processors are configured to encode the second block of video data based on the one or more second parameters.

21. An apparatus for coding video data, the method comprising:
means for performing a parameter derivation operation to determine one or more first parameters for a first block of video data;
means for performing the parameter derivation operation to determine one or more second parameters for a second block of video data;
means for coding the first block of video data using the one or more first parameters for a local illumination compensation (LIC) mode; and
means for coding the second block of video data using the one or more second parameters for one of a cross-component linear mode or weighted sample prediction.

22. The apparatus of claim 21, wherein the second block is coded using the cross-component linear mode, and wherein the first one or more parameters comprises first alpha and beta parameters and the second one or more parameters comprise second alpha and beta parameters.

23. The apparatus of claim 22, wherein the parameter derivation operation comprises a linear regression operation that comprises minimizing regression error between neighboring samples.

24. The apparatus of claim 21, wherein the second block is coded using weighted sample prediction.

25. The apparatus of claim 24, wherein the parameter derivation operation comprises a linear model.

26. A non-transitory computer-readable storage medium storing instructions that when executed cause one or more processors to:
- for a first block of video data, perform a parameter derivation operation to determine one or more first parameters for the first block of video data;
- for a second block of video data, perform the parameter derivation operation to determine one or more second parameters for the second block of video data;
- code the first block of video data using the one or more first parameters for a local illumination compensation (LIC) mode; and
- code the second block of video data using the one or more second parameters for one of a cross-component linear mode or weighted sample prediction.

27. The non-transitory computer-readable storage medium of claim 26, wherein the second block is coded using the cross-component linear mode, and wherein the first one or more parameters comprises first alpha and beta parameters and the second one or more parameters comprise second alpha and beta parameters.

28. The non-transitory computer-readable storage medium of claim 27, wherein the parameter derivation operation comprises a linear regression operation that comprises minimizing regression error between neighboring samples.

29. The non-transitory computer-readable storage medium of claim 26, wherein the second block is coded using weighted sample prediction.

30. The non-transitory computer-readable storage medium of claim 29, wherein the parameter derivation operation comprises a linear model.

\* \* \* \* \*